US012676018B1

(12) United States Patent
Garcia, III et al.

(10) Patent No.: US 12,676,018 B1
(45) Date of Patent: Jul. 7, 2026

(54) METHOD AND SYSTEM FOR CONTACTLESS DRIVER INTERACTION

(71) Applicant: Trusted Driver, Inc., San Antonio, TX (US)

(72) Inventors: Valente Garcia, III, San Antonio, TX (US); Ronald Heinrich, San Antonio, TX (US); Aric Caesar Jimenez, San Antonio, TX (US); Riad Freijy, San Antonio, TX (US); Daniel Gonzalez, San Antonio, TX (US)

(73) Assignee: Trusted Driver, Inc., San Antonio, TX (US)

( * ) Notice: Subject to any disclaimer, the term of this patent is extended or adjusted under 35 U.S.C. 154(b) by 451 days.

(21) Appl. No.: 17/730,965

(22) Filed: Apr. 27, 2022

Related U.S. Application Data

(60) Provisional application No. 63/180,251, filed on Apr. 27, 2021.

(51) Int. Cl.
| | |
|---|---|
| *G06V 30/412* | (2022.01) |
| *G06V 30/42* | (2022.01) |
| *G08G 1/00* | (2006.01) |
| *G06Q 50/26* | (2012.01) |

(52) U.S. Cl.
CPC ............ *G06V 30/412* (2022.01); *G06V 30/42* (2022.01); *G08G 1/20* (2013.01); *G06Q 50/265* (2013.01)

(58) Field of Classification Search
CPC ........ G06V 30/412; G06V 30/42; G08G 1/20; G06Q 50/265

USPC .......................................................... 382/182
See application file for complete search history.

(56) References Cited

U.S. PATENT DOCUMENTS

| | | | | |
|---|---|---|---|---|
| 6,188,329 B1* | 2/2001 | Glier | | G07B 15/06 |
| 2004/0094621 A1* | 5/2004 | LaMont | | G07B 15/063 |
| | | | | 235/384 |
| 2004/0104813 A1* | 6/2004 | Rau | | G08G 1/0175 |
| | | | | 340/901 |
| 2006/0237533 A1* | 10/2006 | Stelzer | | G07G 5/00 |
| | | | | 235/383 |
| 2010/0149334 A1* | 6/2010 | Wirsz | | G08G 1/04 |
| | | | | 348/143 |
| 2012/0117195 A1* | 5/2012 | Mattern | | G06Q 10/10 |
| | | | | 709/219 |
| 2012/0171195 A1* | 7/2012 | Ravindranath | | A61P 29/00 |
| | | | | 424/173.1 |
| 2013/0339891 A1* | 12/2013 | Blumenberg | | G06F 16/9537 |
| | | | | 715/771 |

(Continued)

*Primary Examiner* — Stephen P Coleman

(74) *Attorney, Agent, or Firm* — Brandon T. Cook; Gunn, Lee & Cave, PC

(57) ABSTRACT

A system and method for remote interaction between law enforcement and drivers, including a system and method for creating electronic citations, facilitating remote communication between law enforcement and drivers, and remote adjudication of traffic citations. The system and method comprise a remotely connected network of computer devices, databases, and a central computer processer. The system and method enable law enforcement to input, via the law enforcement officer's computer device, all information necessary to create an enforceable citation. The system and method autocomplete portions of the citation and makes it quicker and easier for law enforcement officers to issue citations, and for drivers to adjudicate citations.

10 Claims, 11 Drawing Sheets

(56)  References Cited

U.S. PATENT DOCUMENTS

| | | | |
|---|---|---|---|
| 2015/0317368 A1* | 11/2015 | Rhoads | G06F 16/248 |
| | | | 705/311 |
| 2015/0358163 A1* | 12/2015 | Carter | G06F 21/645 |
| | | | 713/179 |
| 2017/0032582 A1* | 2/2017 | Moran | H04N 1/00326 |
| 2017/0192624 A1* | 7/2017 | Wu | G06F 40/274 |
| 2018/0060790 A1* | 3/2018 | Stefik | G06Q 10/063116 |
| 2018/0330460 A1* | 11/2018 | Young | G06Q 50/265 |
| 2020/0387992 A1 | 12/2020 | Vij | |

* cited by examiner

23

24

64

31

30

35

46

49

47

48

134

244

E-Citation - Signature Capture

258

| Live Camera | Captured Picture |
|---|---|
| | |
| Capture | Upload |

243

Vehicle Found - Trusted Driver

Lic. Plt. No.

Driver Name, Address

Vehicle year,    Color    Type
model, make

Proceed        Clear

25

51

300

Court Dashboard

Deferred Adjudication

| Citation # | Citation Date/Time | Driver | DOB | Vehicle | License | Officer Name/Badge No. | Select |
|---|---|---|---|---|---|---|---|

301

Contest Citation

| Citation # | Citation Date/Time | Driver | DOB | Vehicle | License | Officer Name/Badge No. | Select |
|---|---|---|---|---|---|---|---|

Fig. 18

Paid Citation

| Citation # | Citation Date/Time | Driver | DOB | Vehicle | License | Officer Name/Badge No. | Select |
|---|---|---|---|---|---|---|---|

Read Citation with No Decision

| Citation # | Citation Date/Time | Driver | DOB | Vehicle | License | Officer Name/Badge No. | Select |
|---|---|---|---|---|---|---|---|

301

Not Read - No Decision

| Citation # | Citation Date/Time | Driver | DOB | Vehicle | License | Officer Name/Badge No. | Select |
|---|---|---|---|---|---|---|---|

Attorney Referred

| Citation # | Citation Date/Time | Driver | DOB | Vehicle | License | Officer Name/Badge No. | Select |
|---|---|---|---|---|---|---|---|

302

Court WorkUp

Citation #          Court Status          Citation Status

Incident Date/Time          Vehicle          Lic Plate

Driver          DOB          State - DL #

Agency          Officer          Print Ticket          304

METHOD AND SYSTEM FOR CONTACTLESS DRIVER INTERACTION

CROSS-REFERENCES TO RELATED APPLICATIONS

This application claims the benefit of provisional patent application No. 63/180,251.

STATEMENT REGARDING FEDERALLY SPONSORED RESEARCH OR DEVELOPMENT

Not applicable.

BACKGROUND OF THE INVENTION

1. Field of the Invention

The present invention relates to a method and system for enabling law enforcement to remotely interact with drivers, and remotely issue traffic tickets, warnings, and feedback to drivers without face-to-face interaction between law enforcement and drivers. The present invention also provides law enforcement officers and court personnel with improved systems and methods for remotely administrating traffic stops, citations, and jurisprudence.

2. Description of the Related Art

Routine traffic stops are the most common cause of face-to-face interaction between law enforcement and citizens. Law enforcement spends significant man power and time conducting routine traffic stops. Recent data and events have shown that face-to-face contact between law enforcement and citizens during routine traffic stops has a tendency to turn antagonistic, which becomes a safety hazard for both law enforcement and the citizen.

Various jurisdictions have attempted to implement red light cameras and/or speed cameras to remotely enforce traffic laws while reducing the need for face-to-face contact between law enforcement and citizens. However, traffic tickets generated by red light cameras, speed cameras, and other automated systems are often unenforceable when challenged in court because no officer can testify as to the infraction.

BRIEF SUMMARY OF THE INVENTION

The present invention comprises system of computer devices and data networks that enable law enforcement officers to conduct a remote traffic stop.

Drivers opt into the program, referred to as the Trusted Driver program. When the driver opts into the program, the driver creates a driver profile via the Trusted Driver website and/or other type of mobile interface. The information provided by the driver includes, without limitation, the driver's name, driver license number, license plate, and vehicle description.

Participating law enforcement officers create a unique law enforcement officer profile. When a participating law enforcement officer observes a driver the law enforcement officer needs to communicate with to either issue a ticket, warning, or other communication, the law enforcement officer enters the license plate number of the vehicle into the law enforcement officer's computing device.

The law enforcement officer's computing device is connected to the Trusted Driver network, and the license plate data from the driver is cross referenced with the Trusted Driver database of participating drivers. If the license plate belongs to a registered Trusted Driver profile, then the law enforcement officer proceeds to conduct the traffic stop using the Trusted Driver system.

The law enforcement officer uses his or her law enforcement Trusted Driver account to create a digital ticket for the incident, recording all information typically included on a paper ticket, including but not limited to, the speed detected, how it was detected, and where the incident occurred. The law enforcement officer can then issue the citation without ever physically pulling over the vehicle and interacting face-to-face with the diver. Alternatively, the law enforcement officer can provide non-ticket communication to the driver, such as general feedback or real time communication.

Once the officer completes the digital ticket and submits it into the Trusted Driver system, the Trusted Driver system automates an email and/or notification to the driver informing the driver that they were issued a ticket and providing the digital ticket to the driver. The driver is given the opportunity to pay the ticket via the driver's Trusted Driver account.

The Trusted Driver System can also be integrated with a community review board made up of community members and city staff. The Trusted Driver System inherently compiles data concerning interactions between citizens and law enforcement. The data collected by Trusted Driver can be provided to and assessed by a community review board to evaluate and monitor interactions between citizen and law enforcement officers in their community. Community review of the Trusted Driver data will allow the community to identify and address issues that arise during interactions between citizens and law enforcement.

BRIEF DESCRIPTION OF THE SEVERAL VIEWS OF THE DRAWINGS

FIG. 18 is a visual representation of an eighteenth screen display from an embodiment of the remote driver interaction system.

FIG. 19 is a visual representation of a nineteenth screen display from an embodiment of the remote driver interaction system.

DETAILED DESCRIPTION OF THE INVENTION

Figure 21:
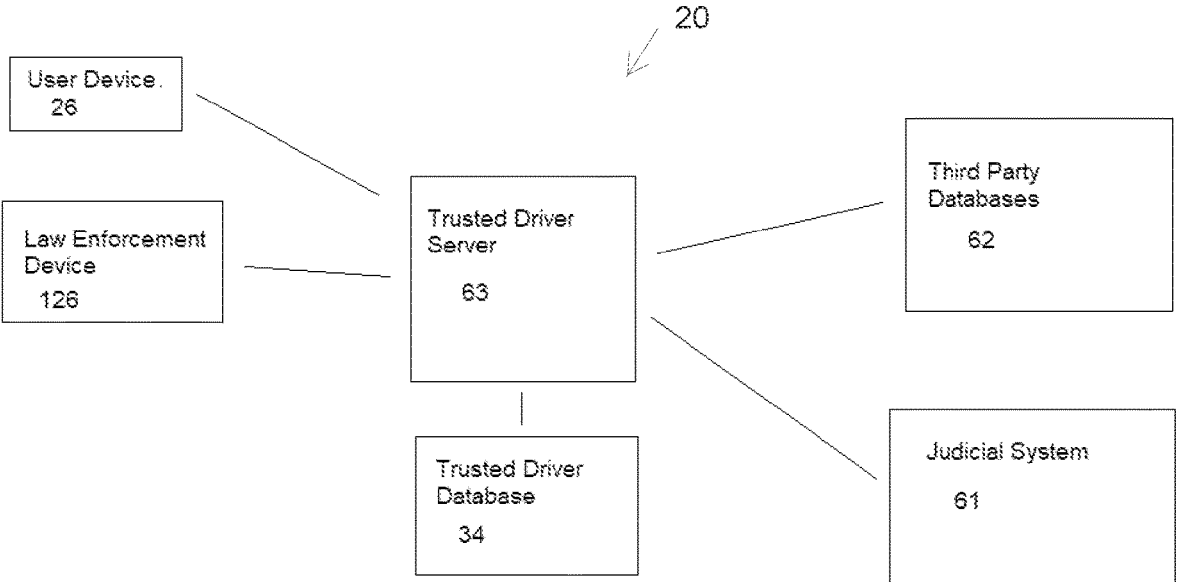
FIG. 21 is a network diagram of an embodiment of the remote driver interaction system.

An embodiment of the remote driver/law enforcement interaction system 20 is described with reference to the title Trusted Driver System 20. As shown in FIG. 21, the Trusted Driver System 20 comprises a remotely connected network of: user device (a) 26, law enforcement device (a) 126, a central server(s) and/or CPU(s) 63, a Trusted Drive Database(s) 34, communication with third party databases 62, and communication with judicial system networks 61.

Figure 1:
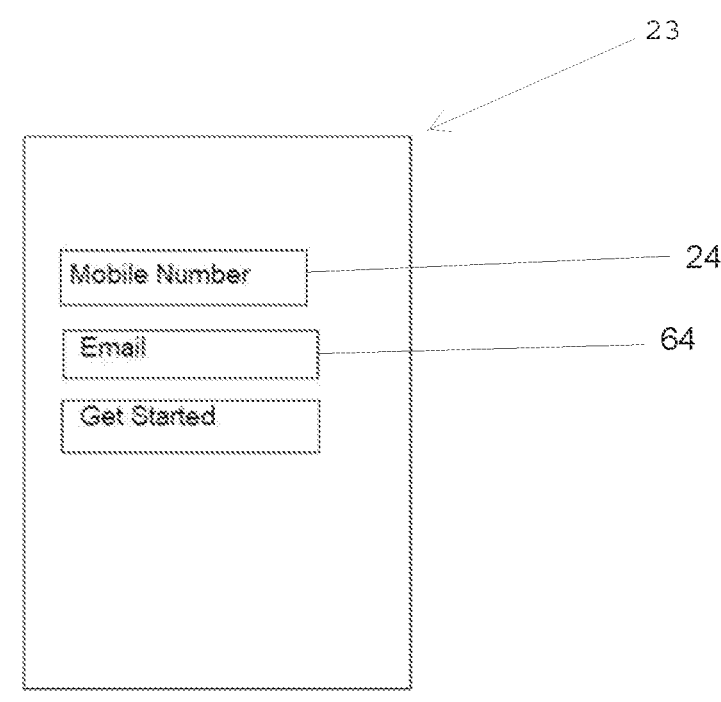
FIG. 1 is a visual representation of a screen display from an embodiment of the remote driver interaction system.

Driver participation in the Trusted Driver System 20 is voluntary. Drivers who want to participate in the system 20 voluntarily register a driver account 21 using the Trusted Driver website 22 and/or Trusted Driver phone application 23. The driver's 10-digit cell phone number acts as the unique personal identifier 24 for the driver account within the Trusted Driver System 20. The driver's cell phone or other computing device serves as the user device 26. The participating driver, also referred to as user, 33 also provides an email address 64. A visual representation of a user account 21 set up is shown in FIG. 1.

Figure 2:
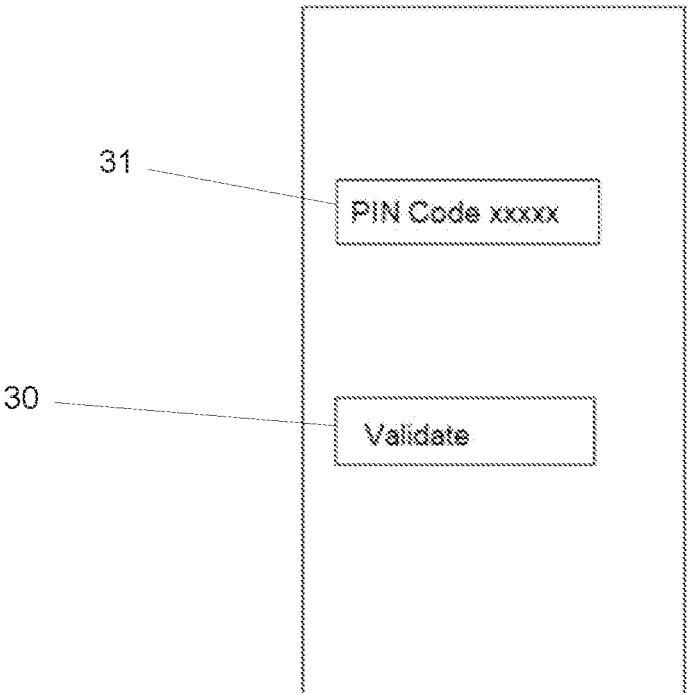
FIG. 2 is a visual representation of a second screen display from an embodiment of the remote driver interaction system.
Figure 3:
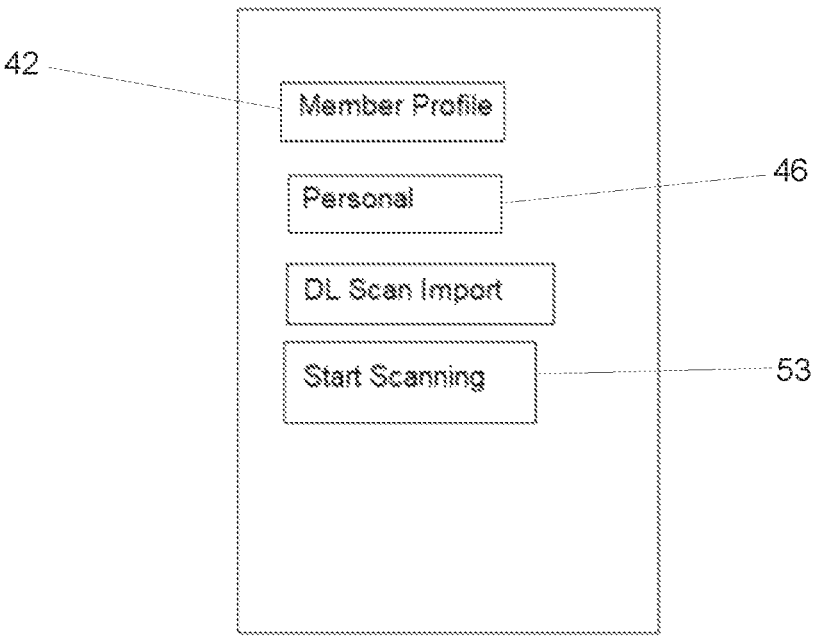
FIG. 3 is a visual representation of a third screen display from an embodiment of the remote driver interaction system.
Figure 4:
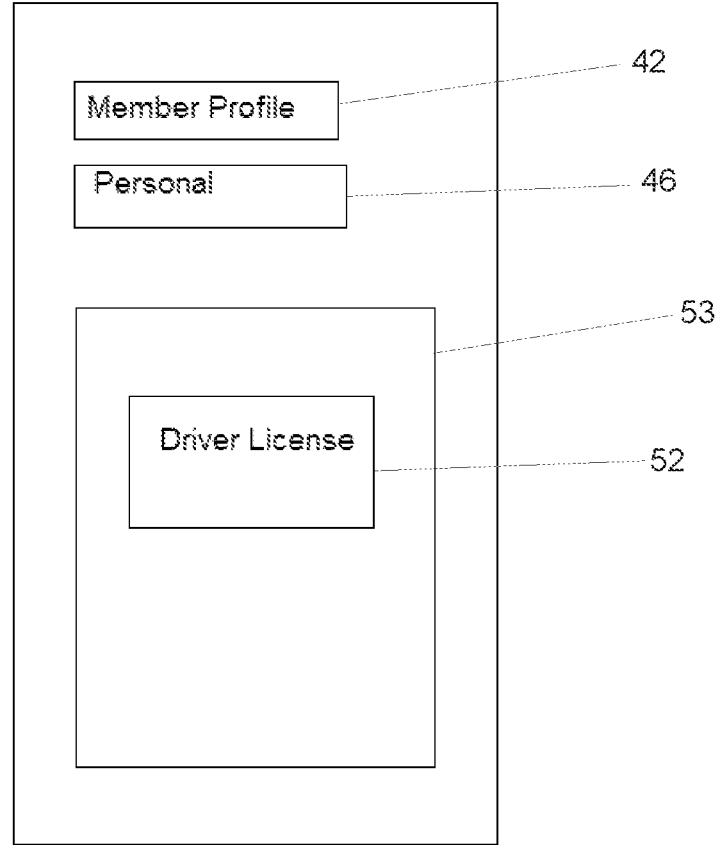
FIG. 4 is a visual representation of a fourth screen display from an embodiment of the remote driver interaction system.
Figure 5:
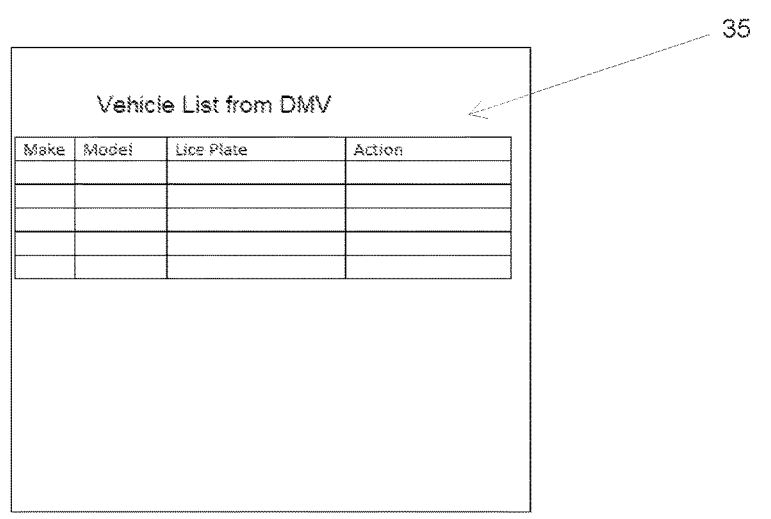
FIG. 5 is a visual representation of a fifth screen display from an embodiment of the remote driver interaction system.
Figure 6:
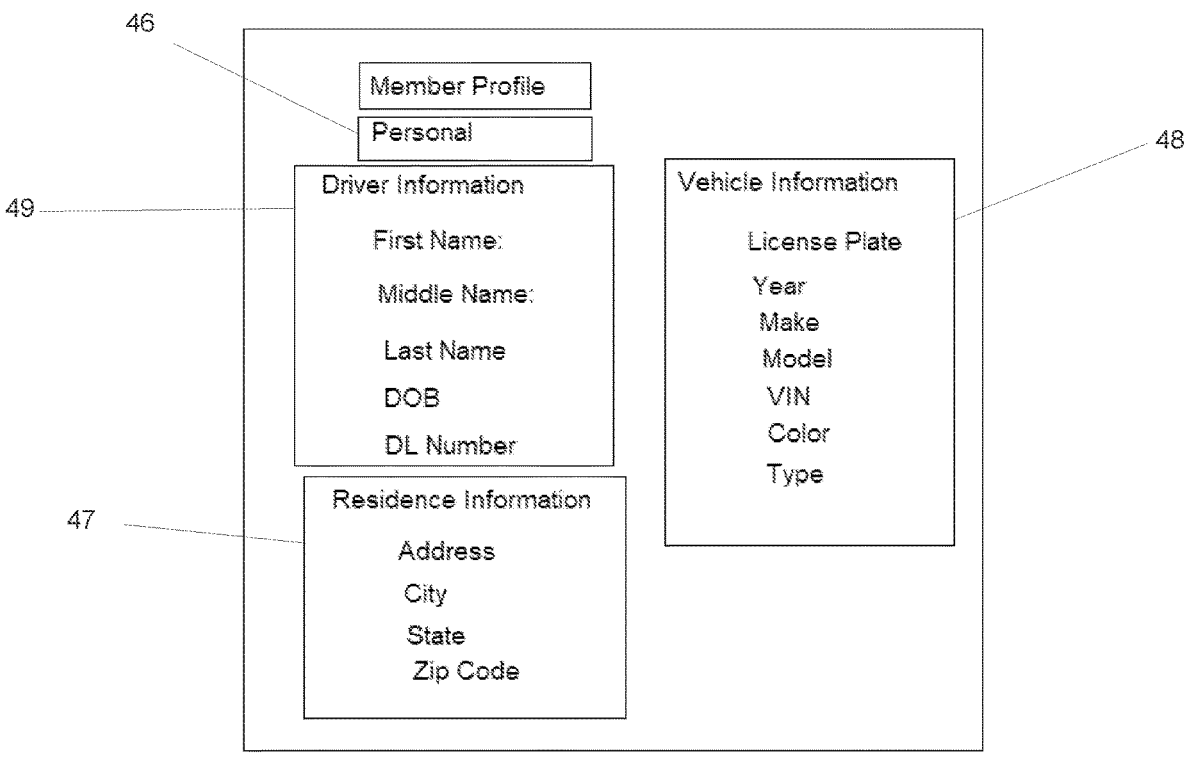
FIG. 6 is a visual representation of a sixth screen display from an embodiment of the remote driver interaction system.
Figure 7:
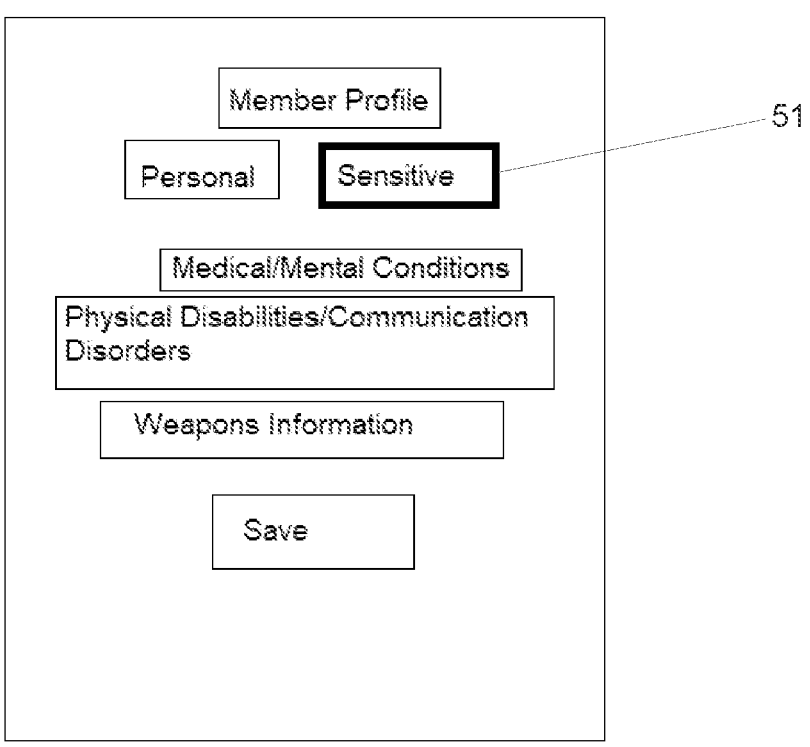
FIG. 7 is a visual representation of a seventh screen display from an embodiment of the remote driver interaction system.
Figure 8:
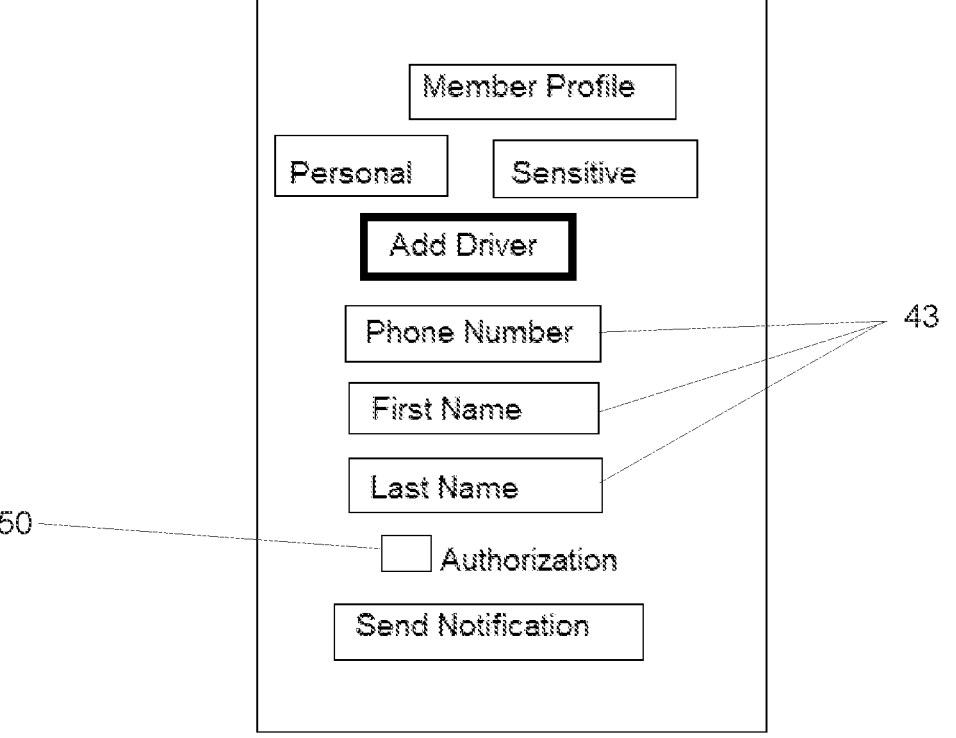
FIG. 8 is a visual representation of an eighth screen display from an embodiment of the remote driver interaction system.

Upon requesting registration, the user 33 is directed to a two-factor authentication protocol 30 to verify the identity of the driver 33 and suitability of the driver's device 26 for use with the Trusted Driver System 20. The Trusted Driver System 20 sends the user 33 a cloud generated PIN 31. The user 33 uses the PIN to access the trusted driver account setup up portal and provide verification data 32 such as identity, address, and vehicle information. The driver 33 inputs verification information 32 into the trusted driver database 34. The Trusted Driver System 20 initiates retrieval of DMV data 35 associated with the driver verification data 32. A visual representation of the authentication protocol is show in FIG. 2.

Upon sign up, the user 33 may be prompted to select their preferred language 56. The user 33 will subsequently see the user displays for the Trusted Driver System 20 in the user's 33 preferred language 56. The translations can be accomplished via a third-party online translation service, or by internal programming.

The Trusted Driver System 20 prompts the user 33 to fill out a member profile 42 by providing user data 25. The member profile 42 may be split into four tabs: personal 46, residence 47, vehicles 48, and drivers 49. Visual representations of a member profile 42 are shown in FIGS. 3-8.

The user 33 may complete the personal tab 46 of the member profile 42 by manually inputting user data 25, including but not limited to, phone number, email address, first name, middle name, last name, date of birth, driver license number, and password. The personal tab 46 also prompts the user 33 to provide authorization for verification 45 via a click to check box. If the user 33 does not provide authorization for verification 45, then the registration fails.

This personal tab 46 is associated with getting an email for the primary member as well as other identity resolution items like-date of birth and driver license number. This is how Trusted Driver 20 verifies who is going to be searched against the third party databases 62. Third party databases 62 include, but are not limited to, RMS (Record Management System), a warrant database, DMV database, or even a threat database for people who present a danger to law enforcement The user 33 may complete the residence tab 47 of the member profile 42 by manually inputting information, including but not limited to, street address, city, state, and zip code. The user completes the vehicles tab 48 of the member profile 42 by inputting information, including but not limited to, year, make, model, color, and license plate number.

Alternatively, the user 33 can scan 53 his or her driver's license 52, specifically the bar code on the back, using a bar code scanner application on the user's computer device 26. The Trusted Driver System 20 will use the information ascertained from the bar code scan 53 of the user's 33 driver license 52 to retrieve department of motor vehicles (DMV) (or similar type of department) data 35 associated with the driver license 52. The Trusted Driver System 20 will automatically complete the member profile 42 using the data gathered from the DMV database 35 and/or other sources. The user 33 will then be prompted to confirm the auto populated information and/or complete any missing information.

The drivers tab 49 of the member profile can be used to review the user information 25. The driver tab 49 can also be used to add additional drivers 65 such as the user's 33 spouse and/or children. One method of adding additional drivers is for the user 33 to provide additional driver 65 contact information 43 including, but not limited to, the additional drivers' 65 phone number, first, and last name. The user 33 is prompted to provide authorization 50 for trusted driver 20 to send notifications to the additional driver 65. The Trusted Driver System 20 will generate an additional driver registration link 44 and send the registration link 44 to the additional drivers 65 so that the additional drivers can input their user information 25.

Alternatively, the user 33 can manually input all necessary driver information 25 for the additional driver 65 and provide authorization for verification 45 for the additional driver information 25.

Alternatively, the user 33 can input user data 25 for the additional driver 65 by scanning the bar code on the additional driver(s) 65 driver licenses. The Trusted Driver System 20 will use the data ascertained from scanning the bar code of the additional driver's license to retrieve data from the DMV 35 and/or other sources associated with additional driver 65 license and use the DMV data 35 to autocomplete the additional driver profile. The user 33 and/or the additional driver 65 will then be prompted to confirm the autocompleted information and/or to provide any missing information.

The drivers tab 49 also provides an opportunity for the user 33 to provide sensitive driver data 51. Sensitive driver data 51 includes, but is not limited to, the user's medical information such as any medical conditions, mental disorders, physical disabilities, communication disorders, and information regarding weapons.

Trusted Driver 20 stores all member profiles 42, and all data included therein, in its database 34 and/or other file saving facilities deemed suitable to store the data.

When Trusted Driver retrieves data from the DMV database and/or other databases, the data may be unclean 57. Unclean, as used in this patent application, means the data is in a format that is noncompliant with either the Trusted Driver System 20 and/or the judicial systems 61 of the relevant jurisdictions. More specifically, DMV data 35 is formatted with significant abbreviations 58. The Trusted Driver System 20 must process 59 the unclean data 57 into a clean data format 60 to be used by Trusted Driver 20. The clean data 60 created by Trusted Driver 20 eliminates abbreviations 58 and is altered to match the user's 33 personal data as used by the judicial systems 61. The Trusted Driver System 20 stores the clean data 60 within its database (s) 34.

Upon registration Trusted Driver evaluates DMV data 35 that is associated with the license plate, owner name, drivers' license number, registration address, vehicle year, vehicle make, vehicle model, and vehicle color provided by the driver 33. The Trusted Driver System 20 automatically accesses relevant law enforcement databases to check for warrant data 37 associated with the driver verification information 32. The warrant data 37 includes whether the driver has any outstanding warrants.

The Trusted Driver System 20 performs a profile validation and cross references 36 the driver verification information 32 and/or other data provided by the user 33 with the DMV data 35 and warrant data 37 associated with the user 33. If the driver verification data 32 matches the DMV data 35 and there is no warrant data 37, the Trusted Driver System 20 issues a verification approval 38. If the profile validation cross reference 36 reveals issues that need to be addressed before profile validation is achieved, the Trusted Driver System 20 issues a verification pending 39 notification. If the cross reference 36 determines the verification information 33 is inaccurate, the Trusted Driver System 20 issues a verification denied 40 notification. The Trusted Driver System 20 generates an email or SMS verification message 41, which is sent to the user 33 providing the user 33 with the results of the validation. The verification data 32 is then saved in the Trusted Driver database 34.

Upon verification approval 38, the user 33 is identified in the Trusted Driver System 20 as a participant.

Law enforcement officers 133 create a law enforcement profile 121 unique to that law enforcement officer 133 using a law enforcement unique personal identifier 124. The law enforcement unique identifier 124 can be the law enforcement officer's ten digit cell phone number or other suitable data. The law enforcement profile 121 is password protected. The law enforcement officer uploads personal law enforcement officer information 125 to his or her profile 121, including but not limited to, name, badge number, and jurisdiction.

When on duty, the law enforcement officer logs into his or her law enforcement profile 121 using the law enforcement device 126. The law enforcement device 126 can be the computer system installed in the law enforcement officer's vehicle 127, a phone, or tablet device.

In some embodiments, the law enforcement vehicle 127 may be equipped with an infrared license plate camera 128. Commercially available license plate cameras are suitable and already commonly installed in law enforcement vehicles.

Figure 9:
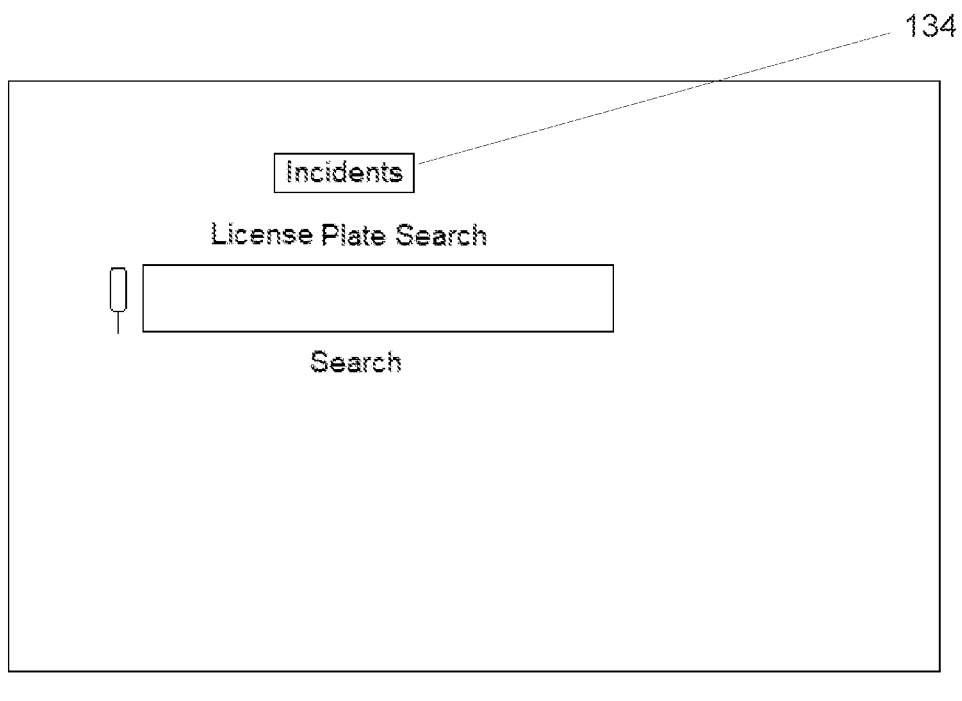
FIG. 9 is a visual representation of a ninth screen display from an embodiment of the remote driver interaction system.

When the law enforcement officer 133 encounters a vehicle 27 that the law enforcement officer wants to interact with to issue a ticket, a warning, or some other type of communication, the law enforcement initiates an incident 134 using the law enforcement officers device 126. A visual representation of an incident is show in FIG. 9.

The law enforcement officer 133 visually ascertains the license plate number 29 of the vehicle 27. The law enforcement officer may manually input the license plate number 29 into the incident 134. Alternatively, the Trusted Driver System 20 is equipped with voice recognition abilities, so that the law enforcement officer may orally dictate the license plate number 29 and the Trusted Driver System 20 will automatically input the dictated license plate number 29 into the incident 134. In some embodiments, the law enforcement officer 133 hits the space bar key on the law enforcement device 126 to trigger the voice recognition. A microphone icon may light up on the law enforcement officer's device 126 to confirm Trusted Driver 20 is currently capturing audio.

Once the license plate number 29 is input into the incident 134, Trusted Driver 20 initiates a search for the license plate number 29.

In some embodiments, a license plate camera 128 could be used to collect driver data 220 from drivers by capturing an image of the driver's 33 vehicle 27 and license plate 29. The driver data 220 is communicated from the license plate camera 128 to a screen readable format on the law enforcement officer's device 126. The information collected by the license plate camera 128 can be used to supplement the license plate data visually captured by the law enforcement officer.

Figure 10:
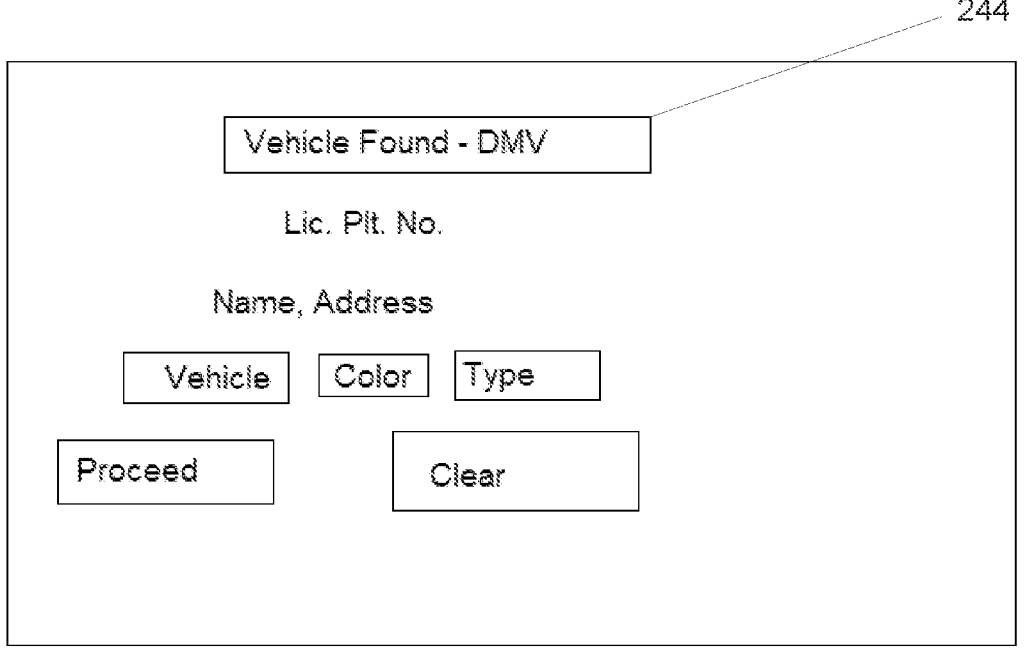
FIG. 10 is a visual representation of a tenth screen display from an embodiment of the remote driver interaction system.

Once the license plate 29 is input into the search bar in the incident 134, Trusted Driver System 20 will search the trusted driver database 34 and/or the third party databases 62 for the identified license plate number 29. If the license plate 29 matches a license plate belonging to a user 33 in the trusted driver database 34, the Trusted Driver System 20 sends the law enforcement officer a participating user confirmation 243. If the license plate 29 does not match the license plate 29 of a user 33 in the trusted driver database 34, then the Trusted Driver System 20 sends the law enforcement officer 133 a non-participating driver message 244. The non-participating driver message 244 may include information about the non-participating driver 28 from third party databases 62 including, but not limited to, driver name, address, vehicle model, make, type and color. A visual representation of a non-participating driver message 244 is shown in FIG. 10.

Figure 11:
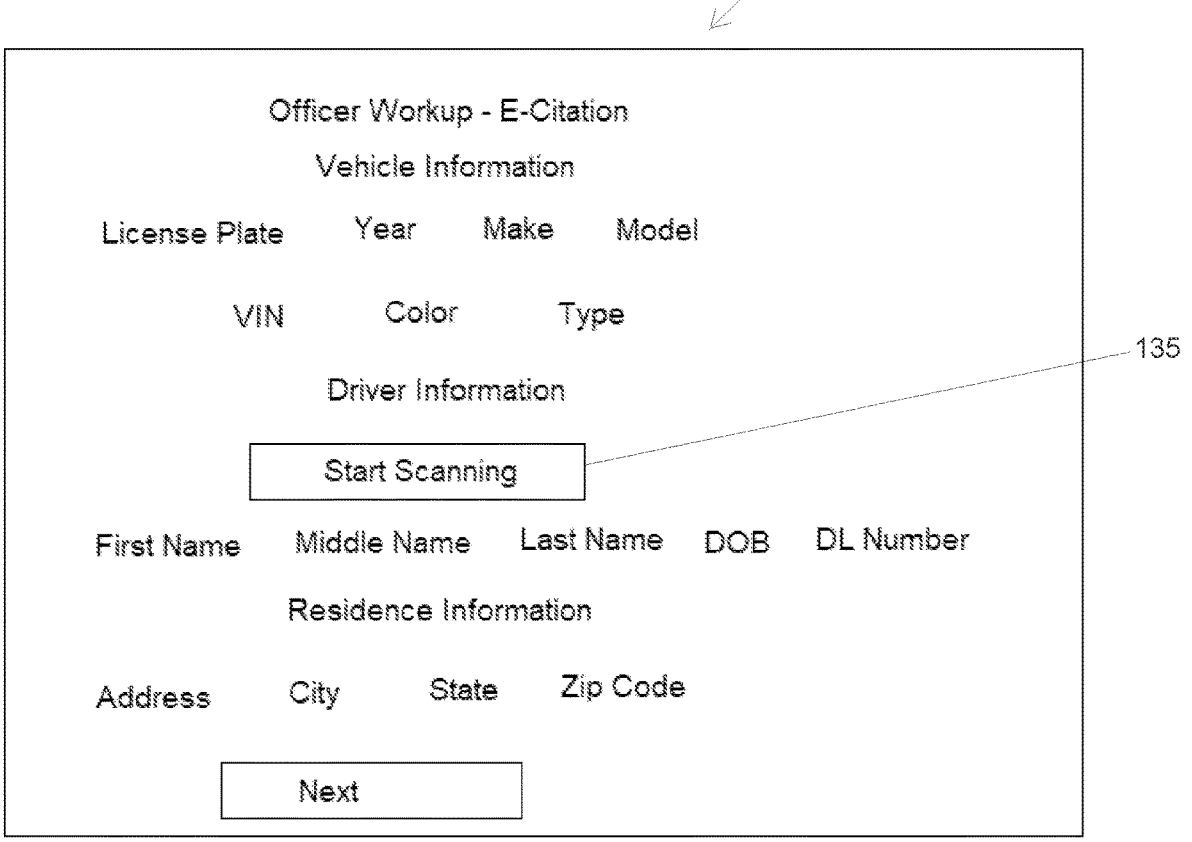
FIG. 11 is a visual representation of an eleventh screen display from an embodiment of the remote driver interaction system.
Figures 12, 13:
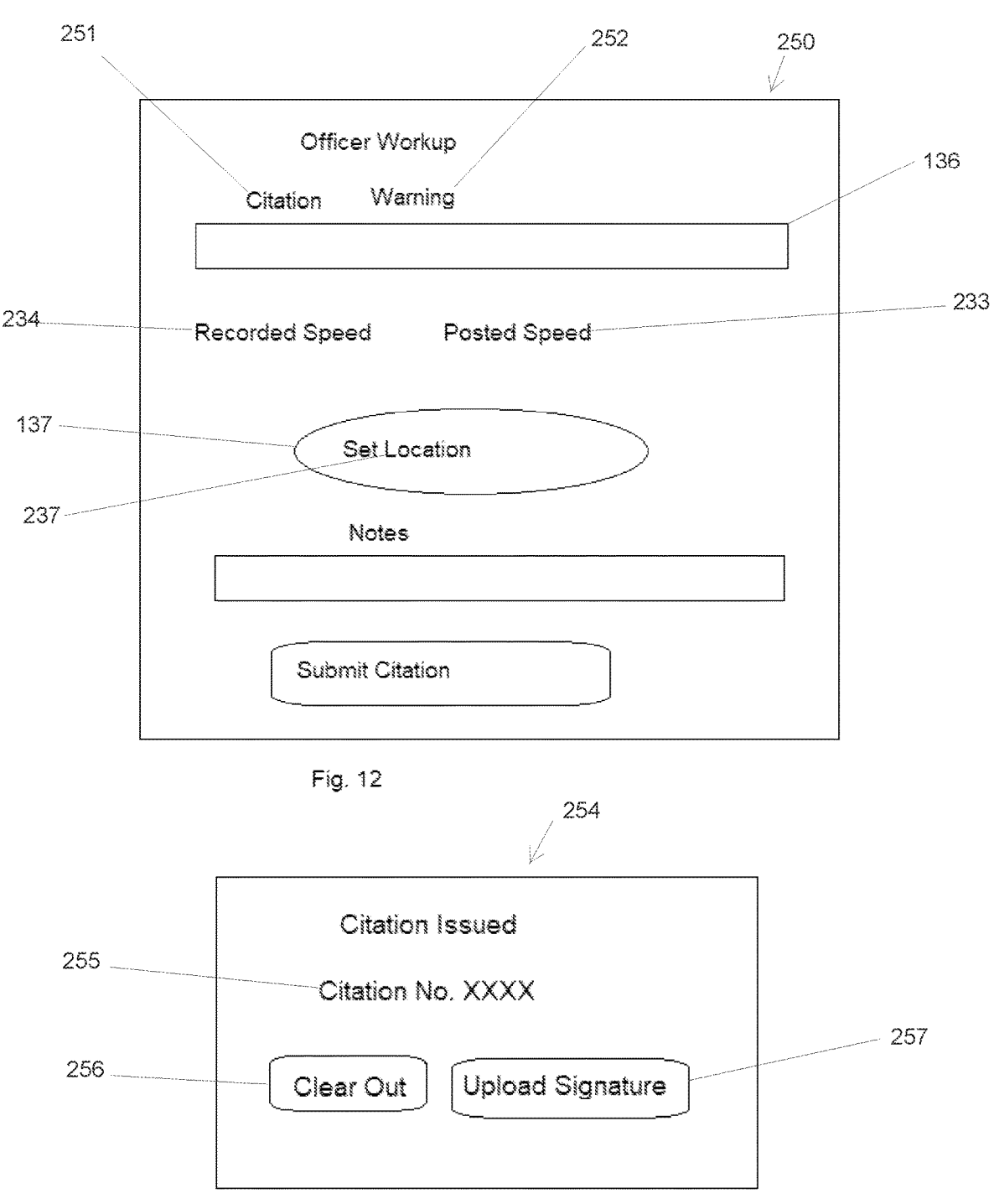
FIG. 12 is a visual representation of a twelfth screen display from an embodiment of the remote driver interaction system.
FIG. 13 is a visual representation of a thirteenth screen display from an embodiment of the remote driver interaction system.

If the law enforcement officer 133 receives a non-participating driver message 244, then the officer 133 executes a traditional traffic stop. The law enforcement officer 133 can use Trusted Driver 20 to issue the non-participating driver 29 an E-citation 250. Visual representations of different stages of an E-Citation 250 work up are shown in FIGS. 11-12.

Trusted Driver 20 will auto populate vehicle information for the E-citation 250 using data gathered from the third party database 62, such as DMV data 35 associated with the license plate number 29. The law enforcement officer 133 can manually input driver information, including but not limited to, name, date of birth, driver license number, and address, into the E-citation 250. Alternatively, the law enforcement officer 133 can scan 135 the non-participating driver 29 driver's license, specifically the bar code on the back, using the law enforcement device 126. Trusted Driver will auto populate the driver information and residence information for the E-citation 250 using data gathered from scanning the bar code on the driver's 29 license.

After entering the vehicle, driver, and residence information for the E-citation 250, the law enforcement officer can select either citation 251 or warning 252. The law enforcement officer selects a violation using a violation drop down menu 136. When the law enforcement officer starts typing or dictating a violation into the violation drop down menu 136, Trusted Driver 20 will provide suggested violations based on a partial or full input by the law enforcement officer. The law enforcement officer selects the appropriate violation from the violation menu 136. The law enforcement officer then inputs the recorded speed 234 and posted speed 233. The law enforcement officer 133 then identifies the location 237 for the violation, using the Set Location button 137. Selecting the Set Location button 137 prompts the law enforcement officer 133 to select the location 237 of the violation using a digital map 138. Those skilled in the art understand that additional information could be included in the E-Citation. The embodiments described herein is not limiting.

When the E-citation 250 is completed, the law enforcement officer submits the citation, triggering a Citation Issued notification 254, including a citation number 255, and options for the law enforcement officer 133 to Clear Out 256 or Upload Signature 257. A visual representation of a citation issued notification 254 is shown in FIG. 12.

To continue the E-citation 250, the law enforcement officer selects Upload Signature 257, then uses a camera on the law enforcement officer device 126 to capture an image 258 of the driver's signature. In some embodiments, the law enforcement officer 133 will have the driver sign a specially designed Trusted Driver E-Citation notice that includes a QR code for the driver to access and pay the E-citation 250. A visual representation of an E-citation 250 signature upload 257 is show in in FIG. 14.

Figures 14, 15:
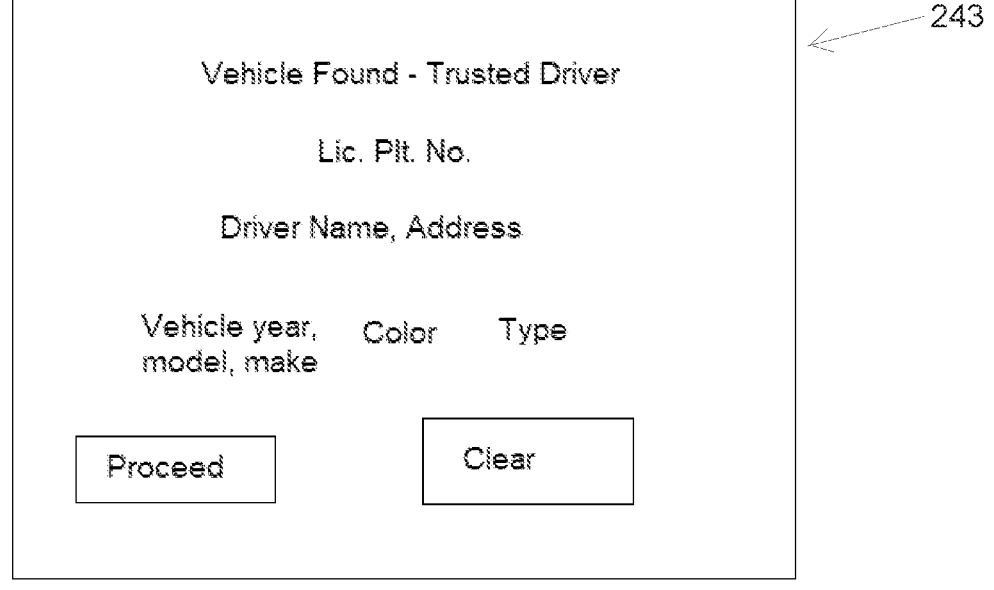
FIG. 14 is a visual representation of a fourteenth screen display from an embodiment of the remote driver interaction system.
FIG. 15 is a visual representation of a fifteenth screen display from an embodiment of the remote driver interaction system.

If the law enforcement officer receives a participating user confirmation message 243, then the officer may use the Trusted Driver System 20 to facilitate communication with the user 33. A visual representation of a participating user confirmation message is shown in FIG. 15.

Figure 16:
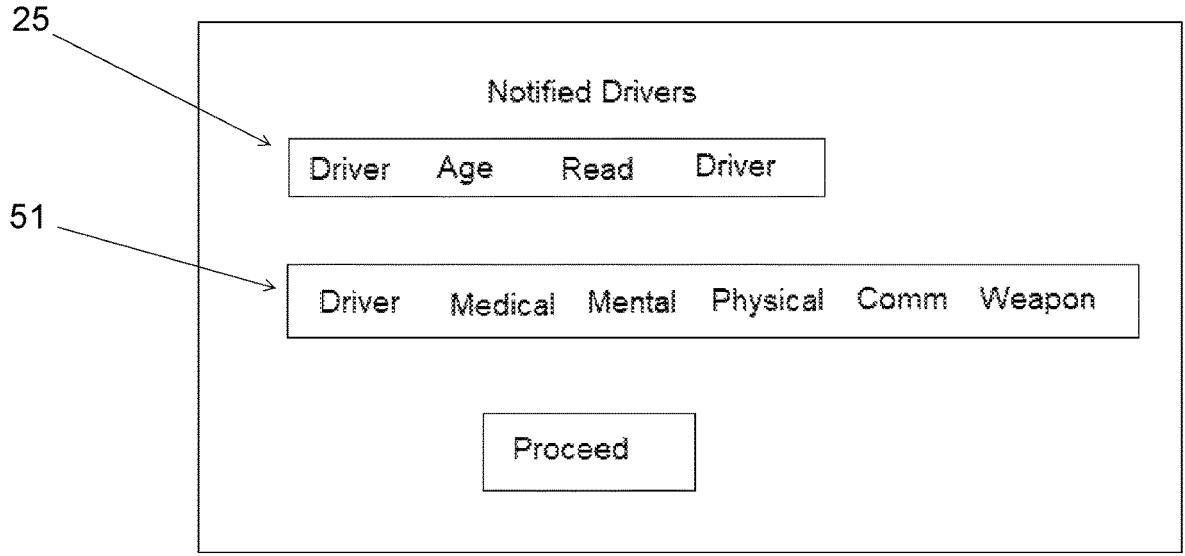
FIG. 16 is a visual representation of a sixteenth screen display from an embodiment of the remote driver interaction system.

Upon confirmation 243 that the driver is a user 33, the Trusted Driver System 20 retrieves the user's 33 information 25 from the trusted driver database 34 and displays the user's 33 information 25, and if applicable sensitive information 51, on the law enforcement officer's device 126. The driver information 25 helps the law enforcement officer 133 determine whether the user 33 needs to be pulled over for a traditional traffic stop or whether the traffic stop can be completed remotely using the Trusted Driver System 20. A visual representation of the user information 25 displayed on the law enforcement device 126 is show in FIG. 16.

Figure 17:
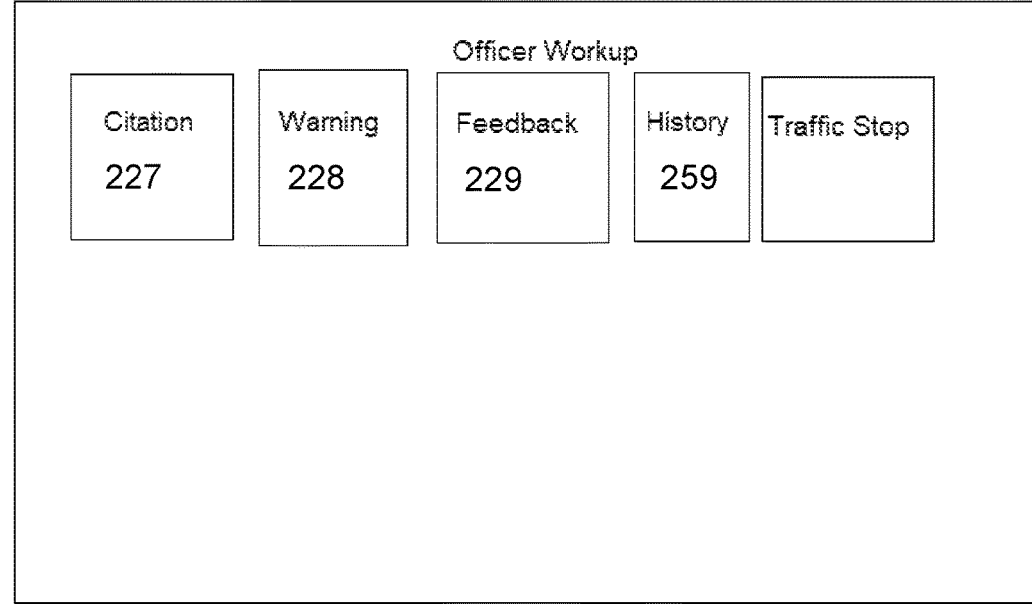
FIG. 17 is a visual representation of a seventeenth screen display from an embodiment of the remote driver interaction system.
Figure 20:
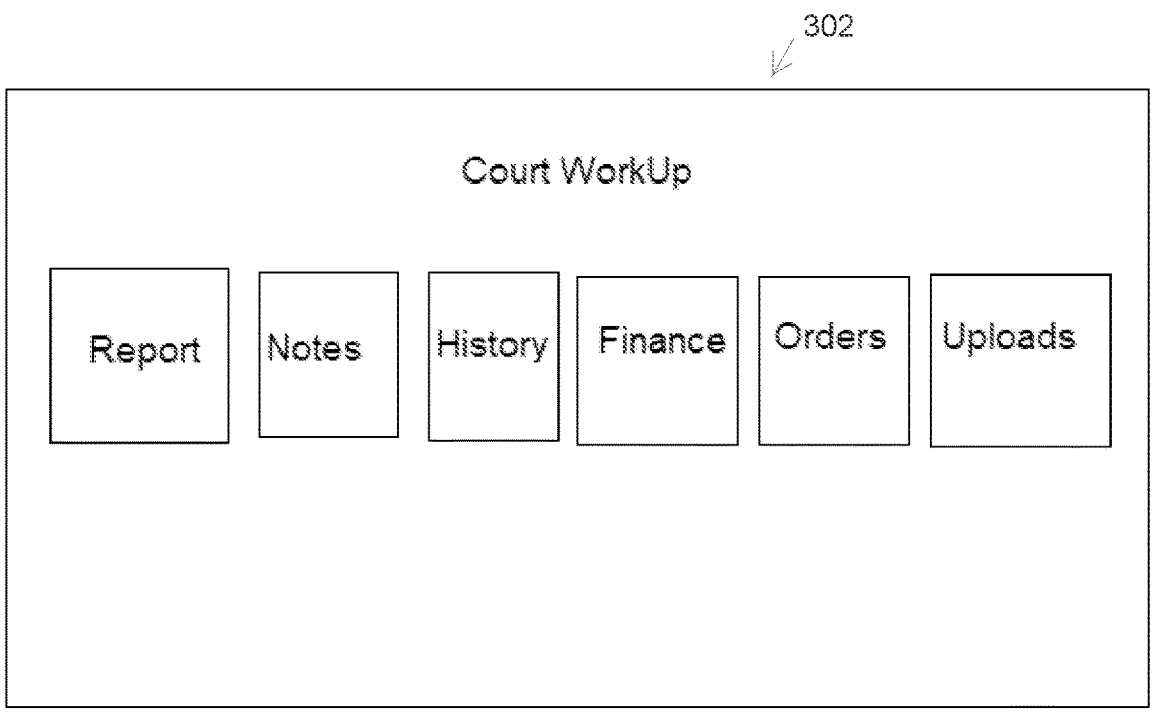
FIG. 20 is a visual representation of a twentieth screen display from an embodiment of the remote driver interaction system.

If the law enforcement officer 133 decides to interact with the driver remotely using the Trusted Driver System 20, the law enforcement officer 133 is given options for interacting with the user, including but not limited to, issue a citation 227, warning 228, issue feedback 229. The law enforcement officer is also provided with historic data 259 on the driver and the vehicle. A visual representation of the law enforcement officer 133 Officer Workup is show in in FIG. 17. Those skilled in the art understand the Trusted Driver System 20 could be configured to include additional options for law enforcement officers 133.

If the law enforcement officer selects the citation 227 option, the Trusted Driver System 20 directs the law enforcement officer to a ticket portal 230. For purposes of this patent application, citation and ticket are used interchangeably. The ticket portal 230 requires the law enforcement officer to enter ticket data 231 into ticket data blanks 232. The ticket data includes, but is not limited to, speed limit 233, driver's speed 234, method of detecting speed 235, time and date of detection 236, location of detection 237, officer name and badge number 238, and jurisdiction information 239. After the officer 133 enters the ticket data 231, the Trusted Driver System 20 generates a citation 240.

The Trusted Driver System 20 is capable of generating a digital map showing the location 237 of the vehicle at the time of the virtual stop. The Trusted Driver System 20 can generate a pin on a map, identifying the exact location of the infraction, and provide such pin point map to the user 33.

Under certain circumstances, usually the occurrence of a minor violation such as a broken signal or light, the Trusted Driver System 20 can send the user 33 a voucher 247. The voucher 247 notifies the user 33 of the issue with the user's 33 vehicle 27, and gives the driver 33 an option to have the issue repaired within a certain time frame. If the user 33 complies with the terms of the voucher 247, the user 33 can receive a rebate or other type of compensation for correcting the issue.

In some embodiments, the Trusted Driver System 20 is integrated with the driver's 33 smart system, such as Apple CarPlay, Google Play, etc. In such embodiments, the law enforcement officer can send voice messages to the driver 33 wherein such voice messages are played aloud in the driver's 33 car via the smart system. Such messages can be pre-recorded, and stored in the Trusted Driver database 34, allowing the law enforcement officer to simply select which pre-recorded voice messages to be sent to the car.

Including specific officer inputted information in the Trusted Driver ticket makes the Trusted Driver ticket 240 more likely to be enforced in court than a ticket automated by a camera and computer system without any officer input, because the law enforcement officer can testify, if necessary, as to the accuracy of the Trusted Driver ticket 240.

The Trusted Drive System 20 is designed so that the law enforcement officer 133 can issue a citation to a user 33 or otherwise communicate with the user without ever needing to pull the user 33 over.

The Trusted Driver System 20 sends a citation notification 241 to the driver profile 21 associated with the ticket 240. The ticket notification 241 can be an email, internal Trusted Driver message, or other type of electronic message. The ticket notification 241 will have a link 242 to the ticket so that the user can view the ticket 240.

The law enforcement officer can use the Trusted Driver System 20 to conduct real time communication 260 with the user 33. When the law enforcement officer uses Trusted Driver 20 to communicate real time 260 with the driver 33, Trusted Driver will create a dialogue box 261 providing information regarding the communication, including but not limited to, a timer timing the communication, confirmation whether the driver received the law enforcement officer's communication, and whether the driver read the law enforcement officer's communication.

Upon receiving a citation 240 via the Trusted Driver System 20, the user 33 can elect the virtual adjudication option 245. The virtual adjudication option 245 allows the user 33 to participate in a virtual court setting to adjudicate the user's ticket 240.

The Trusted Driver System 20 can further be configured to provide emergency notifications 248 to all users 33.

The Trusted Driver System 20 can also be used to supply data to a Community Review Board 246. It is advantageous for a community, such as a town, city, or neighborhood, to be able to assess data concerning traffic stops. Assessing data from traffic stops allows the community to identify and rectify issues that can be extrapolated from the data.

The community review board 246 comprises volunteers from the local community. The volunteers are vetted and provided training before placement on the community review board. The community review board members are granted access to data stored via the Trusted Driver System 20, including but not limited to, body camera video, patrol car video, MDT communications, tickets issued by law enforcement officers, officer disciplinary history, and racial/ profiling data. The community review board 247 will assess why a Trusted Driver was stopped and/or ticketed by police, assess why a particular law enforcement officer has issued an abnormal number of traffic stops/tickets, and/or why a particular law enforcement officer has an abnormal number of traffic stops/tickets to a specific demographic.

The Trusted Driver System 20 further provides a court dashboard 300. The court dashboard 300 can be used by court personnel to track information concerning a driver's traffic history, including but not limited to, citation number, citation date/time, driver name, vehicle information, driver license number, officer name and badge number. Court personnel use court personnel computing devices to access the court dashboard 300. A visual representation of a court dashboard 300 is shown in FIG. 18.

The court dashboard 300 also provides court personnel with the status of each citation, including but not limited to, deferred adjudication, contest citation, paid citation, read citation with no decision, not read—no decision, attorney referred. The court dashboard provides a "select" 301 option next to each citation.

When the court personnel selects 301 a citation, trusted driver 20 creates a Court Workup 302, auto populating the relevant information for the citation, including but not limited to, citation number, court status, citation status, incident date/time, vehicle information, license plate, driver name, driver date of birth, driver license number, agency that issued the citation, officer name and badge number. The court workup 302 provides court personnel the option to print ticket 304. A visual representation of a Court Workup is shown in FIG. 19.

Trusted Driver 20 also provides court personnel with access to information concerning a driver, including but not limited to, Reports, Notes, History, Finance, Orders, and uploads.

One embodiment of Trusted Driver 20 may provide vital data to first responders when a vehicle is involved in an accident. First responders, such as fire fighters and emergency medical technicians ("EMT"), 404 create first responder accounts 400 using a first responder device 401. The first responder device 401 can be a phone, tablet, or computer. The first responder device may be integrated into a first responder vehicle 405, or it may be a standalone device. The first responder account 400 is remotely connected to, and in remote communication with, the Trusted Driver server 63.

When a vehicle is involved in an accident, such accident is usually reported by a bystander 403 calling 9-1-1 or otherwise notifying the police or other relevant authorities. The bystander 403 visually ascertains the license plate number of the vehicle involved in the accident. The bystander 403 reports the license plate 29 to police or other relevant authorities, and such license plate 29 is relayed to the first responder 404. The first responder 404 uses the first responder account 400 to search Trusted Driver 20 for the license plate. Trusted Driver 20 searches its database 35 to determine whether the license plate 29 involved in the accident matches the license plate 29 of a Trusted Driver user 33. If Trusted Driver confirms the license plate 29 matches the license plate of a user 33, Trusted Diver 20 sends the Driver's information 25 and sensitive data 51 to the first responder wherein the information 25 and sensitive data 51 is in a screen readable format on the first responder device 401.

Receiving a driver's information 25 and sensitive data before arriving at the scene of the accident allows the first responder to be better prepared to assist the driver. The first responder will know ahead of time whether the driver has medical history that will need specific treatment.

One embodiment of Trusted Driver 20 may provide vital data to fire fighters 406 in the event of a house fire. Fire fighters and/or fire department administrative personnel create a fire fighter account 407 using a fire fighter device 408. The fire fighter account 407 is remotely connected to, and in remote communication with, the Trusted Driver server 63.

In the event of a fire, the fire fighter or fire department personnel can use the fire fighter account 407 to search Trusted Driver 20 for the address(es) involved in the fire. Trusted Driver 20 then searches the trusted drive database 35 for the address. If the address matches the address of a Trusted Driver user 33, then Trusted Driver 20 sends the user's information 25 and sensitive data 51 to the fire fighter device 401 in a screen readable format.

Trusted Driver 20 can further send messages and/or notifications to other Trusted Driver users 33 with addresses near the address of the fire. Such messages can be warnings or evacuation notices to help remove neighbors from danger, or merely informational to update the neighbors on the status of the fire.

Those skilled in the art understand that different nomenclature can be used to describe the Trusted Driver System 20 components without changing the substance of the technology. Those skilled in the art further understand that the Trusted Driver System 20 has been described with regard to a particular embodiment, but variations of the Trusted Driver System 20 are understood by the inventor and the system could be used with a different series of steps and with, or without, certain aspects of the system. Those skilled in the art further understand that the embodiment described herein has been described with reference to particular types of information. The Trusted Driver system 20 could be implemented to operate using more or less information regarding users and/or vehicles.

The invention claimed is:

1. A method for issuing a citation using an electronic citation program comprising the following steps:

a law enforcement officer visually ascertaining the license plate of a vehicle;

the law enforcement officer inputting the license plate number into the electronic citation program via a law enforcement officer computer device;

said electronic citation program is remotely connected to a third party database such as the department of motor vehicle database;

upon receipt of the license plate number, the electronic citation program searches the third party databases for the identified license plate and retrieves vehicle information from the third party database associated with the license plate number;

the electronic citation program uses the vehicle information obtained from the third party database to partially prepare a citation with the vehicle information obtained from the third party database;

the law enforcement officer completes the citation by inputting a violation type, location of the violation, time and date of the violation, and the officer's name and badge number;

the law enforcement officer completes the citation by inputting a violation type, location of the violation, time and date of the violation, and the officer's name and badge number.

2. The method of claim 1 wherein the step of inputting a type of violation comprises the law enforcement officer is presented a drop down menu of violation types and selects a violation type from the drop down menu to input the violation type into the citation.

3. The method of claim 1 wherein the step of inputting a type of violation comprises the electronic citation system providing suggested violation types based on a partial input of violation type by the law enforcement officer.

4. The method of claim 1 wherein the step of inputting the location of the violation comprises the law enforcement officer is presented a digital map wherein the law enforcement officers selects a position on the map to input a violation location.

5. The method of claim 1 wherein the step of the law enforcement officer inputting the license plate number into the electronic citation program via a law enforcement officer computer device comprises the law enforcement officer manually inputting the license plate number into the electronic citation program via a law enforcement officer computer device.

6. The method of claim 1 wherein the step of the law enforcement officer visually ascertaining the license plate of a vehicle comprises the law enforcement officer manually observing the license plate of a vehicle.

7. The method of claim 1 wherein the step of the law enforcement officer completes the citation comprises selecting between citation or warning.

8. The method of claim 1 wherein the step of the law enforcement officer completes the citation step comprises the electronic citation system creating a citation issued notification.

9. The method of claim 1 further comprising the law enforcement officer uses the electronic citation program to print a physical document representing the citation;

the driver signs the document;

the law enforcement officer uses the electronic citation program and the law enforcement officer's device to capture an image of the driver's signature on the document.

10. The method of claim 1 further comprising the electronic citation program generating a QR code associated with the citation wherein the QR code provides access to the electronic citation.

* * * * *